July 18, 1961  W. T. INGRAM  2,992,986
TREATMENT OF SEWAGE AND OTHER WASTE MATERIAL
Filed Sept. 22, 1955  6 Sheets-Sheet 1

FIG. I

INVENTOR.
WILLIAM T. INGRAM
BY
ATTORNEYS

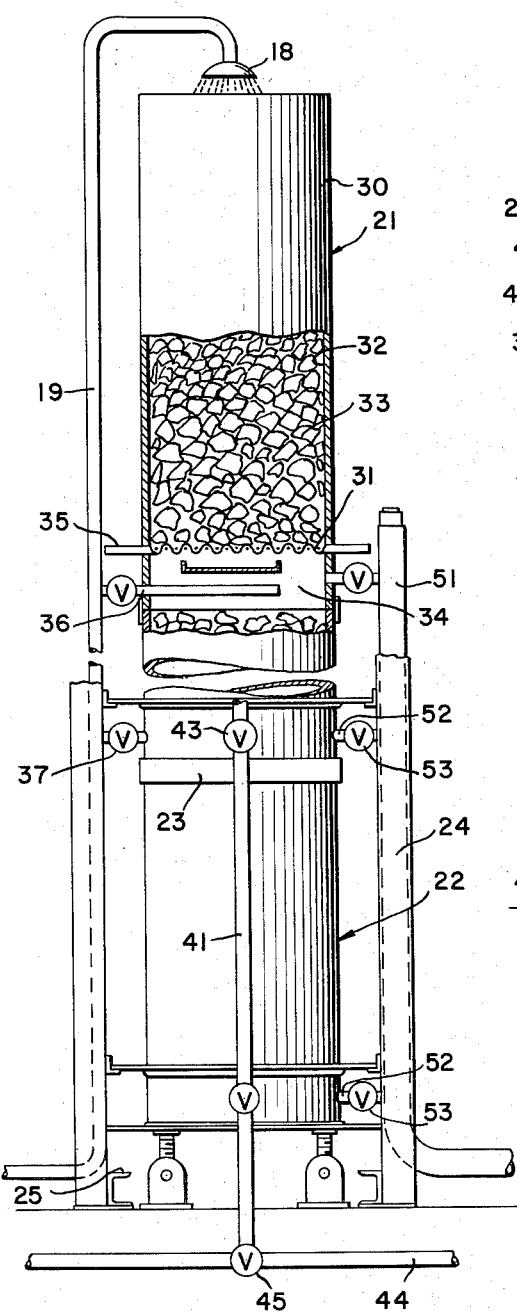
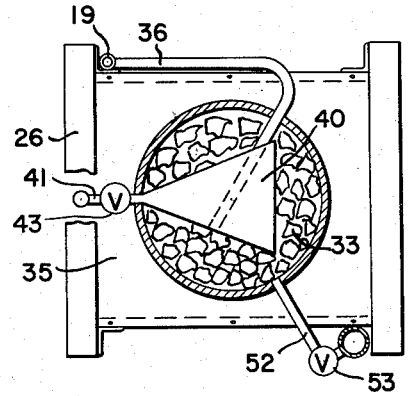
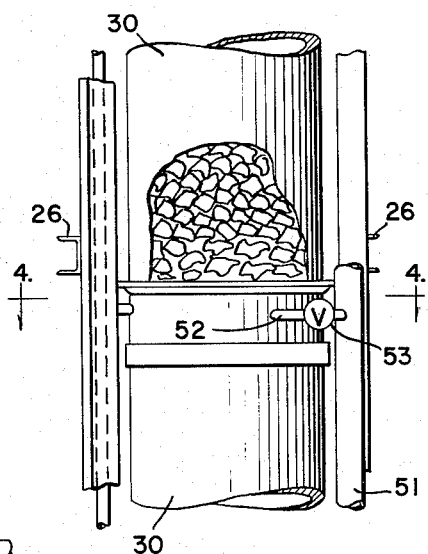
FIG. 2
FIG. 4
FIG. 3
INVENTOR.
WILLIAM T. INGRAM
ATTORNEYS July 18, 1961 — W. T. INGRAM — 2,992,986
TREATMENT OF SEWAGE AND OTHER WASTE MATERIAL
Filed Sept. 22, 1955 — 6 Sheets-Sheet 3

INVENTOR.
WILLIAM T. INGRAM
BY
ATTORNEYS

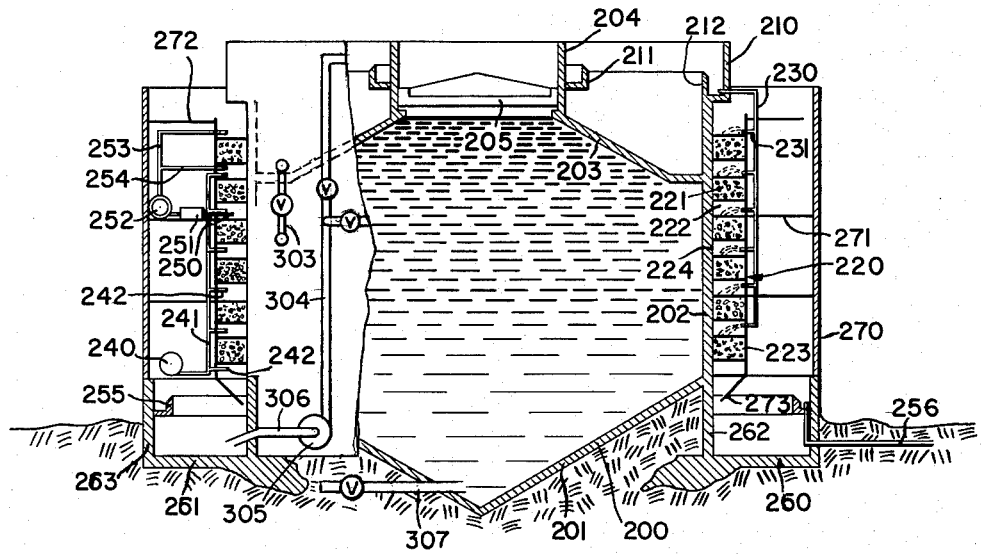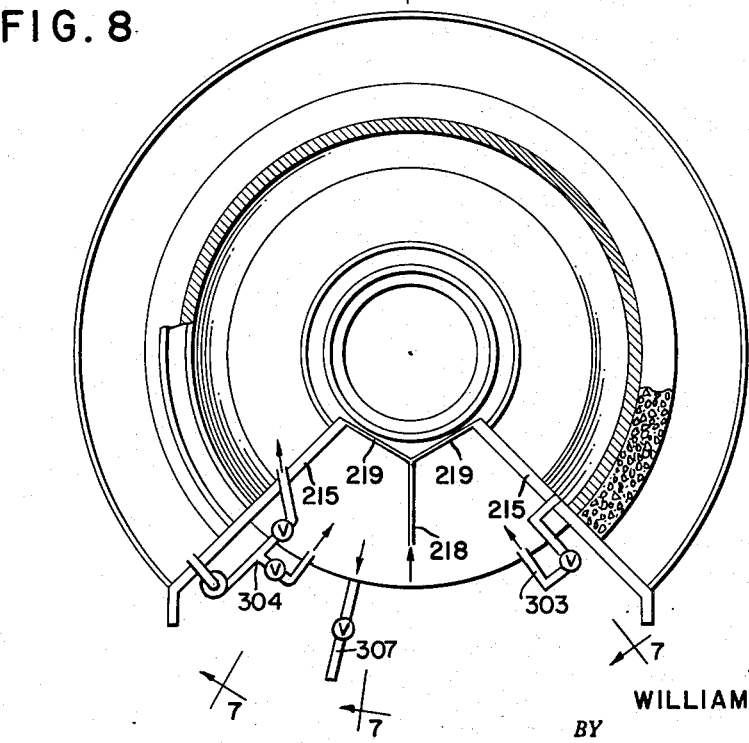

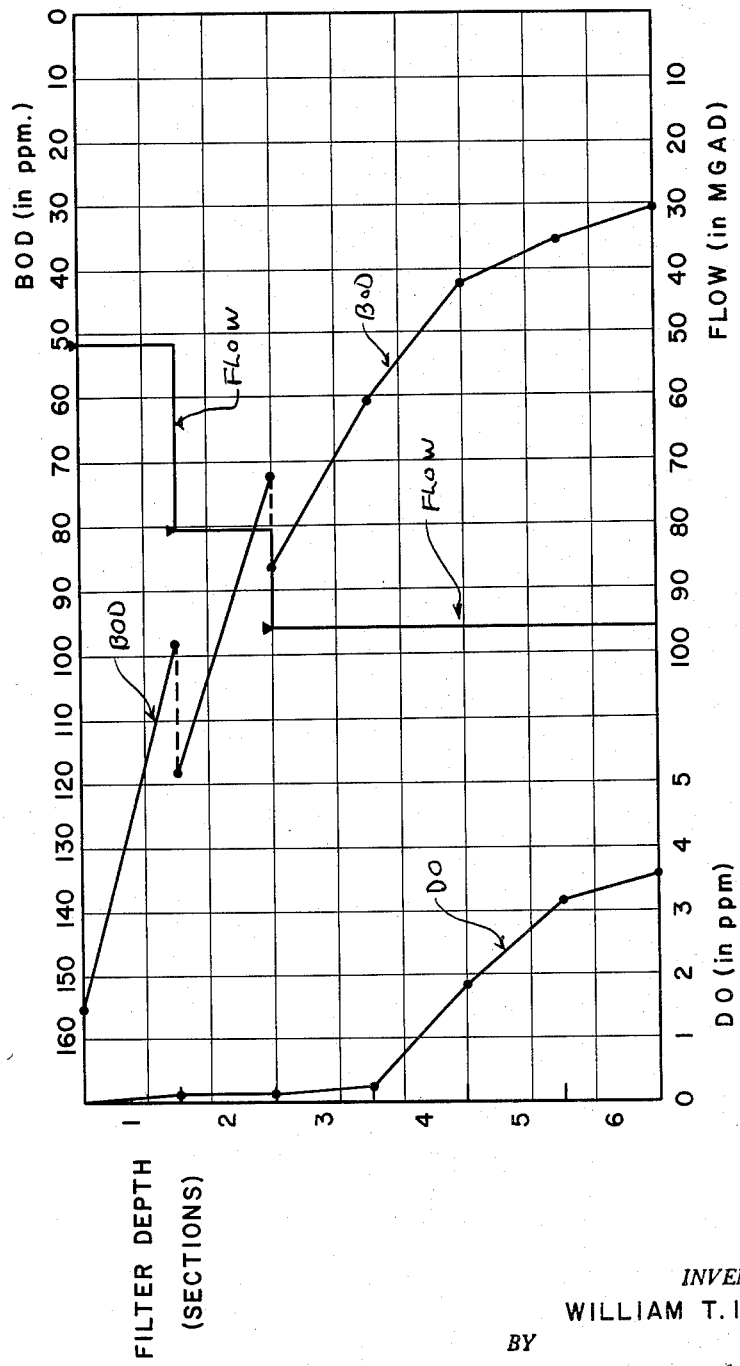

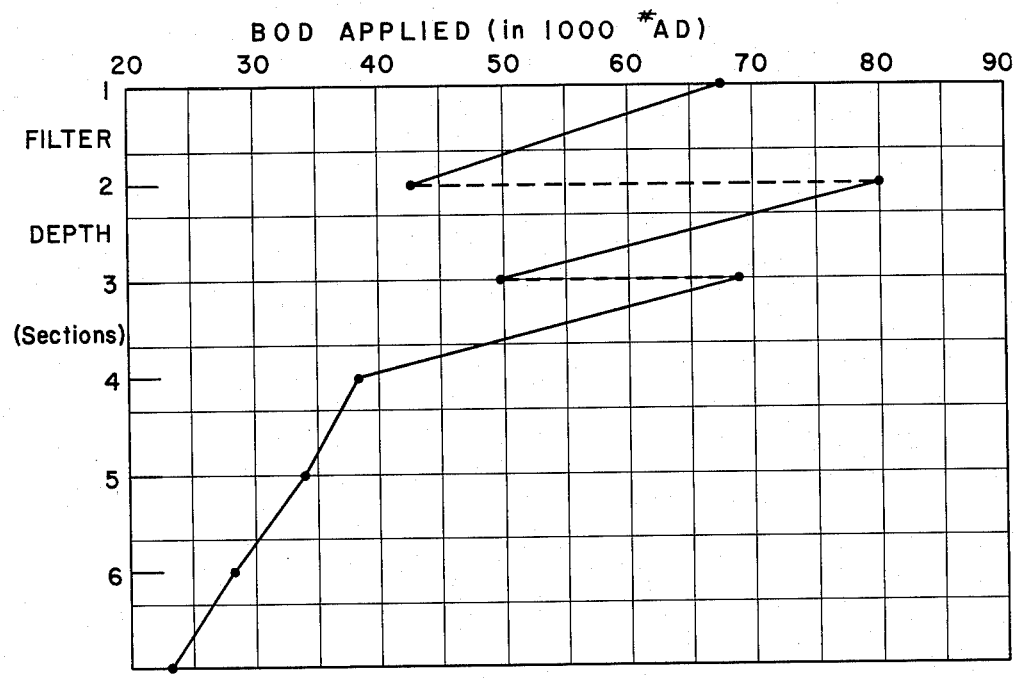
FIG. 10 — PROFILE OF SURFACE LOADING

2,992,986
TREATMENT OF SEWAGE AND OTHER WASTE MATERIAL

William T. Ingram, Whitestone, N.Y., assignor to Pacific Flush Tank Company, Chicago, Ill., a corporation of Illinois Filed Sept. 22, 1955, Ser. No. 535,967
25 Claims. (Cl. 210—17)

My invention relates generally to the treatment of sewage and other waste material for final disposal purposes and it has to do more particularly with a system for and method of treating such material by subjecting it to the action of a trickling filter. It is to be understood that the terms "sewage" and "waste material" wherever used herein are intended to include not only ordinary domestic sewage but also all other waste materials that require filtering treatment similar to ordinary sewage for final disposal.

Raw sewage as it as delivered to the treatment plant contains organic material in colloidal, suspended and dissolved forms. Customarily, raw sewage is first subjected to a primary treatment wherein it is passed through a settling tank where the settleable, suspended solids are settled out. After such settling the liquid contains a large percentage of the original organic material and the greater portion of such material is in either dissolved or colloidal form. Before such sewage material from the settling tank is discharged to a point of final disposal it is customary to treat it in such a way that it is free from objectionable polluting constituents. Various processes have been employed for this purpose, one of which is filtration, wherein the sewage material is subjected to a secondary treatment by passing it through a trickling filter.

Trickling filters as heretofore usually employed are single-bed structures wherein the complete filtering operation is carried out. They usually comprise a bed of coarse material such as gravel or crushed stone which is from 6 to 10 feet in depth and many hundreds of square feet in area. The sewage material is fed to the upper surface of the filter by any suitable means such as the usual stationary spray devices or traveling or rotary distributor devices and the material so applied trickles down through the filter bed and is discharged therefrom to a desired point of disposal. In the use of such a filter a gelatinous film or slime forms on the surface of the filter media and this film supports a heavy growth of active organisms.

Nutrients suspended in the sewage liquid are adsorbed on the slime surface and furnish energy for the normal metabolism of the organisms making up the slime. When air is present in the interstices of the bed, oxygen is dissolved in the liquid and is utilized by the organisms for normal metabolic processes. Thus the organisms act upon the sewage material in such a manner as to change the form of the organic material from an objectionable putrescible one into a stable one substantially free from polluting influences. Such a filter bed functions both mechanically and biologically in the performance of its function.

The biological function is of great importance in achieving the stable condition hereinbefore mentioned. Whenever a favorable environment promoting growth of organisms that will act upon the sewage material to change the organic material into a stable form is provided, great numbers of organisms thrive on nutrients furnished originally from the sewage liquid and subsequently in converted forms as end products of normal metabolism of organisms living within the filter slime and in the filter liquid.

The organisms in the sewage and the slime as the sewage passes over the filter media adjust to the environment provided and growth becomes a function of the food supply, existence of adequate oxygen and temperature. While adverse conditions introduced by reason of certain substances in the sewage can and do affect the environment, the organisms adjust rapidly to changing conditions when they are in an active growth phase and existing in a favorable environment.

Trickling filter processes as heretofore employed require installations of very large areas with consequent large investments in plant and in maintenance. Various attempts have been made to improve the efficiency of trickling filters with a view to improving the capacity of a filter of any given size.

Such attempts include the use of so called "high rate" filters, which are usually of less depth than standard filters and are operated at higher loading rates than conventional filters, with various expedients to provide the required intimate association between the waste materials and the organisms in the filter.

In one such attempt to improve the efficiency of a trickling filter the material to be filtered was fed to the filter at a controlled, substantially uniform rate and the feed periodically interrupted to provide intervals of rest. Such an arrangement requires the use of a large capacity reservoir to store and handle any excess material flowed thereto during any high peak flow period and rest period. Moreover, the operation requires careful control over the feed to maintain the necessary flow during the feeding periods and the necessary cessation of flow during the rest periods.

In another attempt to provide a so-called "high rate" filter it was suggested that the sewage to be filtered be supplied to the filter continuously and without rest periods at a daily average rate higher than previously employed and at a comparatively low distribution ratio. In this case it was necessary, in order to obtain such low distribution ratio that the sewage be equally and uniformly applied to all portions of the filter bed surface during any momentary period.

In still another proposal for providing high rate filtration the filter was so constructed as to physically separate the "ammonification zone" and the "nitrification zone" in such a way that they functioned as separate units with a settling tank being provided for receiving the effluent from each of the separate units of the filter.

In still another attempt to improve the efficiency of a filter it was proposed that the sewage be passed through a relatively shallow depth of filtering material many times rather than to allow it to trickle through a greater depth of rock but once, as in the conventional filter. This system requires the use of a detention tank or tanks to retain the waste material for the required period of settling, after each passage through the filtering material.

All of the aforementioned attempts to provide high rate filters, even though they permitted some reduction in the size of the filter bed, required other equipment such as auxiliary tanks, which offset to some extent, at least, the savings in space and cost resulting from the reduction in size of the filter.

In all of the aforementioned attempts at improvement the importance of the filter environment has been recognized only in part. As a result certain desirable characteristics of that environment have been interfered with or entirely removed, as for example, the denial of oxygen to organisms in deeper portions of the filter bed, or the partial removal of desirable nutrients.

In addition to the foregoing, it has been proposed to increase the capacity of a trickling filter by increasing the depth of the bed. However, it was found that merely increasing the depth of the filter bed did not permit the operation of such filter at rates substantially in excess of those employed in standard trickling filters. Such operation has been found not only inefficient but actually deleterious to the quality of the effluent.

An object of my invention is to provide an improved trickling filter treatment process for sewage whereby high hydraulic and organic loading of the filter may be employed with resulting high efficiency of operation in the filter.

An object of my invention is to provide an improved trickling filter treatment process for sewage and other waste material wherein novel means for controlling filter environment, including simultaneous food supply, oxygen supply and control of temperatures, all favorable to growth of sewage organisms, are employed with resulting high efficiency of operation of the filter at high hydraulic and organic loading of the filter.

Another object is to provide an improved trickling filter treatment process for sewage wherein peak loadings of the sewage to be filtered may be accommodated without requiring storage tanks.

Another object is to provide an improved filtering treatment process for sewage whereby the sewage is sufficiently stabilized for final disposal purposes even when maximum rate of application of the sewage in the filter is employed.

Still another object is to provide for an improved filtering treatment process for sewage whereby the treatment of the sewage in any particular one of the several zones of a filter may be controlled in respect to both hydraulic and organic loading and the period of subjection of the material to the action of such zone.

Another object is to provide a trickling filter treatment process in which raw sewage to be filtered is fed onto a plurality of successive sections of a trickling filter with the effluent from each section passing to the next section, and air is introduced simultaneously under all of the sections of the filter.

Another object is to provide a novel trickling filter of compact structure and capable of operation at high loading rates with high efficiency.

Another object is to provide a trickling filter having a plurality of successive sections, with means for feeding sewage to be filtered onto a plurality of such sections and means for introducing oxygen under a plurality of such sections.

Another object is to provide a trickling filter of compact form which is readily adapted for assembly with other sewage plant structures such as a settling tank, or a digester or both.

Another object is to provide a combined trickling filter and settling tank structure of compact form and high efficiency.

A further object is to provide a combined trickling filter and digester structure which occupies only slightly more ground area than the digester alone.

Other objects are to provide for the handling of higher rates of application or organic loadings than heretofore; to provide treatment wherein the sewage to be filtered may be applied continuously to the filter; to provide a filter and treatment whereby the cost of original installation of the filter and cost of operation both are reduced; to provide for a small filter thereby reducing installation costs and the area necessary for the filter; to provide for increased filter capacity whereby more sewage may be treated in a given size filter unit, or a smaller unit may be used to filter a given amount of material.

Other objects and advantages of the invention will appear from the following description taken in connection with the appended drawings, wherein:

FIG. 2 is an enlarged side elevational view, partially in cross-section, showing the filter unit of FIG. 1;

FIG. 3 is a fragmentary elevational view of a portion of the structure of FIG. 2 and taken at 90 degrees from the position shown in FIG. 2;

FIG. 4 is a view of a horizontal section taken along line 4—4 of FIG. 3;

FIG. 7 is a somewhat diagrammatic vertical sectional view through a third embodiment of the invention;

FIG. 8 is a top plan view of the structure of FIG. 7;

FIG. 8 is a graph including profile curves showing hydraulic loading, biochemical oxygen demand (BOD) and dissolved oxygen (DO) plotted against filter depth the values being the average of the values for five periods of observation of a filter in accordance with my invention; and FIG. 10 is a graph including a profile curve showing the BOD loading corresponding to the curves of FIG. 9.

Figure 1:
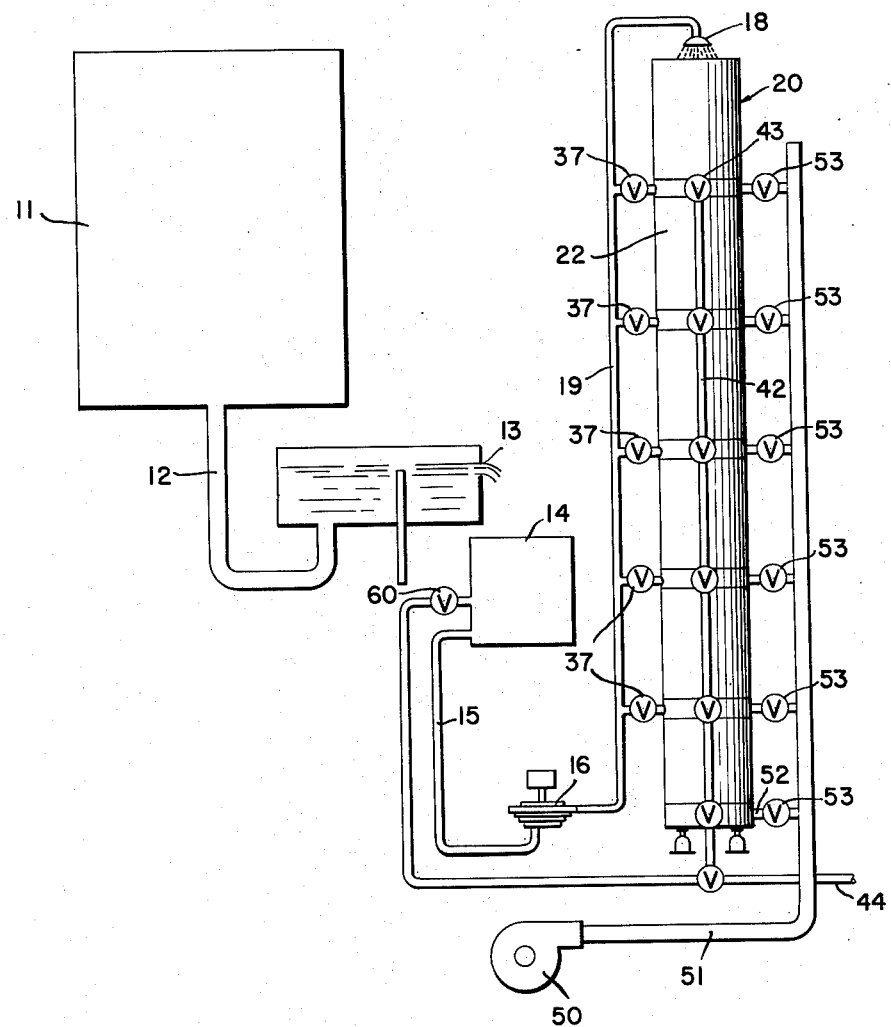
FIGURE 1 is a diagrammatic view of one form of system for carrying out the present invention.

According to my invention, I provide in the several sections of a trickling filter an environment which is controlled as to food supply, oxygen presence and temperature, with the result that the trickling filter operation may be carried out with unusual efficiency.

I have found that a trickling filter may be operated at hydraulic and organic loading rates far in excess of those heretofore employed if the raw waste material is fed substantially continuously to two or more successive sections of the filter with the effluent from each section being passed to the next section and with air being supplied to each section in quantities substantially equal to the oxygen demand of the respective sections.

In accordance with my invention I employ a filter which is substantially deeper than filters conventionally employed. The filter which I employ is at least approximately 15 feet in depth and, other than the cost of construction there is no limiting factor of the total depth of filter since, as will appear hereinafter, the particular condition of food supply, oxygen presence and temperature desired can be developed and maintained on any section or sections of the filter. However, I prefer to employ a filter of a depth within the range of 15 to 36 feet.

The filter is arranged for sectional operation whereby waste material may be supplied to one or more successive sections independently and each section is provided with its own oxygen supply. That is to say, the arrangement is such that sewage to be filtered may be supplied to any one or more of the sections, with the effluent from each section being delivered to the next succeeding section. Also, the arrangement is such that oxygen is supplied under each of the sections with the oxygen from each section passing into the next preceding section.

I have found that in any trickling filter, whether it be a single continuous bed of the conventional filter type, having a depth of from six to ten feet, or a deep filter, having a depth of from 15 to 36 feet or more, and whether the latter be a single, continuous filter or sectionalized as in my invention, the biological reactions are divided into natural zones in which different types of organisms act upon the sewage. In the initial or upper portion of the filter, the complex organic nitrogen compounds are decomposed to more simple nitrogen compounds and ammonia, which action has been termed "ammonification." In the lower or later portion of the filter the nitrogenous compounds that are formed in the upper or earlier zones are decomposed or converted first to nitrites, and eventually the nitrites are oxidized to nitrates, which action has been termed "nitrification."

Accordingly, by operating the filter in a sectionalized manner, as in my invention, I am able to control to considerable extent the activity of the several sections to the end of providing the most efficient operation of the filter to accomplish the desired decomposition of the organic matter and stabilization of the filter effluent.

The depth of any one section of the filter is equivalent to the depth normally used in high rate filters. Such depths range from three to six feet, and I have found that this depth provides very satisfactory results. Each section is at least three feet in depth in order to prevent short circuiting and may be considerably more than six feet in depth but such greater depth does not improve the results sufficiently to warrant the added cost. I have found that the most satisfactory results are obtained where the filter consists of five or six sections each of a depth within the range of from three to six feet are employed, and thus the total depth of the filter amounts to from 15 to 36 feet. While I prefer to employ sections of approximately the same depth, this is not absolutely essential and the sections may be of different depths throughout the filter, as may be found desirable in any particular situation.

As is well known, it is important that the material passing through the filter be stabilized before it is discharged from the filter so that it will not cause pollution of the stream or other body of water into which it is discharged. In such stabilization, the material is converted to nitrites and nitrates which require no further oxygen and wherein is stored sufficient oxygen to provide the oxygen requirements for any future break-down of the organic products in the effluent. Such stabilization insures the production of an effluent which after settling remains clear and stable. I have found that a stable effluent can be produced by passing the effluent from the initial portion of the filter through a later portion wherein the material is subjected to aeration by the oxygen supplied to such later portion, without the application of any additional raw, unfiltered waste material. That is to say, the effluent from the earlier portion of the filter, after having passed through said portion and having undergone initial decomposition of the organic material therein, is caused to pass through a portion of the filter wherein the oxygen supply causes the organic material in the filter material to be converted to nitrites and nitrates.

In order to accomplish the foregoing I prefer to pass the effluent from the earlier sections of the filter through at least three later sections of the filter, which for convenience I designate as "stabilizing" or "polishing" sections, wherein the effluent is supplied with oxygen sufficient to fully meet the oxygen demand of the material and without the addition of any further raw material. The total depth of all stabilizing sections is a minimum of nine feet in order to provide the necessary stabilization.

While, as indicated above, I prefer to provide a filter having six sections, nevertheless in some cases as few as four sections may be provided. I have found that in some cases full and adequate filtration of sewage may be effected where only a single initial section and three stabilizing sections are provided, in lieu of three initial sections and three stabilizing sections, as in the preferred form of my invention. Therefore, I wish to point out that while the number of initial sections to which raw sewage is supplied may be reduced from three to one, nevertheless I prefer not to reduce the number of stabilizing sections to less than three, in order to insure that the effluent from the filter may be fully and completely stabilized.

The filter in accordance with my invention may be operated under extreme variations of hydraulic loading, but for maximum efficiency the flow to the filter preferably is maintained at a reasonably constant rate. In view of the fact that the sewage does not always arrive at the filtration plant in uniform quantities, equalizing tanks may be used as needed to reduce peaks in flow. However, as explained more in detail hereinafter, I prefer to accommodate peaks in flow by loading the first or initial section to the fullest extent possible and by loading the sections subsequent to the first section (except the last three) to the extent necessary to accommodate the load and thereby eliminate the need for equalizing tanks, or at least minimize as much as possible the capacity of such equalizing tanks.

The filter influent, that is to say, the unfiltered sewage, which preferably has been subjected to an initial settling action to remove settable solids, and which I have referred to hereinafter for convenience as the "raw sewage" is applied to the initial section of the filter by any suitable known means, including a high rate means such as a trough, insuring application to the top of the section with reasonably equal distribution over the area. Owing to the substantial depth of the filter employed in accordance with my invention, minor variations in the distribution pattern are readily accommodated and the distribution therefore is substantially uniform through the filter. That is to say, the depth of the filter and its operation at high hydraulic rates provides a substantially equal distribution of the flow without short-circuiting even though the initial application of material is not absolutely uniform.

A filter constructed and operated in accordance with my invention will permit hydraulic and organic loadings greatly in excess of those possible with any prior filters. For example, I may employ hydraulic loadings in excess of 200,000,000 gallons per acre per day (MGAD) and total organic loadings in exess of 7.46 pounds per square foot per day or 325,000 pounds per acre per day, in a filter 18 feet deep, divided into six sections, the first three of which are employed as initial filtering sections and the last three employed solely as stabilizing sections.

In operating the filter in accordance with my invention in order to obtain maximum loadings, I load the first section at the maximum permissible as determined by periodic tests on the effluent from the first section. Simultaneously with the feeding of the raw sewage to the first section, I preferably feed additional raw sewage to the second and third sections. I have found that it is possible to feed to the second section as much as 47% of the loading on the first section, and to the third section as much as 20% of the loading on the first section. In other words, an addition of 67% in loading over the loading of the first section may be effected on the second and third sections together, without reducing the BOD removal efficiency below that usually considered satisfactory for trickling filter performance. In fact, it is believed practicable to load the second section to 55% and the third section to 29% of the first section. Moreover, it is possible to load the fourth section of a six section filter to the extent of 15% to 20% of the first section loading, but with a resultant sacrifice in the extent of stabilization owing to the reduction in the stabilizing capacity of the filter as a result of such loading of the fourth section.

Excellent results also have been obtained by feeding sewage only to the top section, or only to the first two sections, with the effluent therefrom passing downwardly through the succeeding sections and with air being supplied under all of the sections.

Inasmuch as the process is best carried out by controlling the hydraulic and organic loading of the filter, I prefer to provide means for controlling the flow of material to the filter. This means may comprise a controlled weir or the equivalent. Where the variation between peak and minimum flow of the waste material is substantial, it may be necessary to provide a detention tank or a controlled weir tank of substantial volume. However, I prefer to control such peak and minimum rates of flow by the control of the loading of the second and third sections of the filter and to maintain the maximum loading on the first section of the filter.

The control of the hydraulic loading rate is important as the filter functions at the maximum efficiency where the rate is substantially constant except where there is a wide and unusual variation in the organic loading. In this connection I have noted variations between morning and afternoon observations involving 125% increase in organic load with no increase in effluent BOD.

In addition to the foregoing, I also may control the organic loading rate by recirculation of the waste material in the manner such as described elsewhere herein.

Under certain circumstances it may be found desirable to withdraw the effluent from any one of the filter sections and return it to one of the preceding sections. In fact it may be found advantageous to withdraw effluent from a section of filter and return it to the top or head of the same section. Thus, my invention contemplates recirculation of the effluent from any one of the filter sections through the same or any preceding section or sections. Preferably such recirculation is effected by combining the effluent from any section with raw, unfiltered waste material being fed to the section to which the effluent is fed. That is to say, in the preferred operation of my filter there is no mere recirculation of effluent but the material delivered to any section of the filter consists either of raw, unfiltered sewage, or a combination of raw, unfiltered sewage and effluent from a succeeding filter section.

Ordinarily recirculation is effected by withdrawing effluent only from the bottom of one or more of the upper three sections but it is to be noted further that effluent from any one of the stabilizing sections may be returned to the same section or a preceding stabilizing section and fed to the stabilizing section without combining it with any raw, unfiltered sewage. This practice is particularly advantageous where it is found that owing to the loading of the filter it is desired that additional stabilizing of the effluent be provided prior to discharge of the effluent to a point of disposal. In such case, it will ordinarily be found satisfactory to remove effluent merely from the last of the stabilizing sections and return it to the same or a preceding one of the stabilizing sections, and the effluent is not ordinarily withdrawn from any of the preceding stabilizing sections for recirculation. Ordinarily where material withdrawn from a stabilizing section is recirculated it is not passed to a section above the stabilizing sections of the filter but only to a stabilizing section, although the stable character of the effluent from the lowest section is such that it may be mixed with raw sewage and applied to one or more of the top sections thus permitting greater flexibility in both hydraulic and organic loadings on these upper sections.

An important feature of my invention is the manner in which air is supplied to the filter. I have found that it is important to supply air to each section of the filter in quantities substantially sufficient to meet the oxygen demand of the particular section. Any system of air distribution within the filter providing for reasonably equal dispersal of the air to the filter bed of any section is satisfactory. In order to insure that an adequate supply of air is provided and to accommodate any minor, unequal distribution of air within each section, I prefer to operate the filter with an excess of total air. As will appear more particularly hereinafter, in the preferred embodiment of the invention I operate the filter in such manner that the oxygen which is not consumed in a particular section is allowed to pass into the next preceding section so as to insure that such preceding section receives an excess of air. The supply of air to each section of the filter independently allows for controlled variations in the air supply required to meet the demands of any particular filter section.

In other words, if any section of the filter, except the initial section, is over-aerated, the oxygen passing from that section to the next preceding section is available for use in such preceding section.

Any suitable means, such as a blower, may be provided for supplying air to the filter. The filter structure which I prefer to employ in practicing my invention is so constructed that the only source of air is that provided by the blower whereby the total flow of the air can be readily determined, as by suitable metering devices, and readily controlled.

The air supplied to any section of the filter is supplied under only sufficient pressure to cause the air to flow into the filter section, and ordinarily such pressure is very low owing to the fact that the resistance developed within the filter to the flow of air therethrough is very slight and no substantial back pressure is created. Under ordinary circumstances, any air which enters the filter is caused to flow upwardly therethrough without the application of substantial pressure thereto or what might be termed as "forcing" pressure. There is usually enough updraft in the filter to raise the air, and it is necessary only to supply enough pressure to overcome the resistance in the conduit leading into the filter.

The air velocity within the filter is so low that the air pressure within the filter is negligible. The openings between the filter stones provide adequate air passage for the volume of air supplied, and thus no back-pressure is created.

I have found that the oxygen demand of a filter is the greatest at the initial or top portions thereof, and therefore I prefer to supply the greater percentage of the total oxygen to the initial or earlier sections of the filter with a lesser proportion of the oxygen being supplied to the subsequent or following sections of the filter. For example, in the preferred embodiment of my invention I supply approximately half the total air supply to the bottom of the first two sections of the filter (that is to say, one-fourth of the total air to each of the two upper sections) and the remaining half of the total air to the bottom of the remaining sections (that is to say, one-eighth of the total air to each of the last four sections, where six sections are employed).

While the amount of air to be supplied to the filter will vary in accordance with the oxygen demand of the organic material passing through the filter, nevertheless I have found that with ordinary sewage or waste materials having an equivalent oxygen demand, the oxygen demands of the filter will be met where one cubic foot of air is supplied for each gallon of sewage passing through the filter.

Where stronger wastes are to be filtered, such as dairy or industrial wastes, it may be necessary to increase the amount of air supplied substantially. For example, with milk waste I have found it desirable to supply as much as 1.5 cubic feet of air per gallon of waste passing through the filter.

The advantages of a sectional operation of a filter as in accordance with my invention, and particularly the supply of air under each section, can best be realized where the air is introduced under each section in an "interspace" or "interphase" under the section. The arrangement of the "interspace" is such that the effluent from the section is allowed to fall freely from the filter bed of the section through the interspace and onto the next section and the air is supplied under the section through such "interspace," wherein it is permitted to mix freely with and be taken up by the effluent without confinement or restriction of the latter, other than the confinement provided by the filter casing. The "interspace" thus provides for mixing of the air with the effluent from the corresponding section with very greatly improved results and efficiency of operation of the filter.

I have found that where air is supplied independently and simultaneously to the several sections of a deep filter the results are much more effective than where the same total quantity of air is supplied to the bottom section only of a similar filter. It appears, therefore, that the supply of air simultaneously and independently to the several sections of the filter is more efficacious than the supply merely to the bottom section of the filter.

I have found that the trickling filter will operate at the highest efficiency if the temperature of the contents is maintained a uniform temperature and at the optimum temperature for the growth of the particular micro-organisms existing within the filter and which serve to act upon the organic material in the sewage to convert them to the desired end products. I have found that a satisfactory and easily maintained temperature in the filter—that is, the temperature of the material passing through the filter—is approximately 20° C. However, very satisfactory results have been obtained with temperatures ranging from 16° C. to 27° C.

As is known, raw sewage is customarily supplied to a filtration plant at a temperature of about 18° C. to about 22° C., and I prefer to maintain the temperature of the material within the filter at approximately such temperature. Ordinarily this is relatively simple, especially where the filter is located in a heated building. Where the filter is not located in a heated building, or where the building in which the filter is located is not heated, it is possible in some cases to maintain the desired temperature of the material within the filter by merely insulating the interior of the filter from the space exterior of the filter. This may be accomplished by any suitable insulating means, in accordance with known practice.

It may be found desirable to increase the temperature of the material passing through the filter in order to obtain maximum efficiency of the filter. Where this is desired, I accomplish it by supplying air to the filter at a temperature sufficient to maintain the desired temperature of the material passing through the filter. Ordinarily this may be accomplished by drawing air from the building in which the filter is located, which air under normal circumstances is at a temperature suitable to provide the desired temperature of the material passing through the filter. However, where this is not feasible or where the temperature of the air in the building is lower than would provide the desired temperature in the material passing through the filter, I preheat the air before passing it into the filter by any suitable air-heating means.

Ordinarily there is no serious problem in connection with preheating of the air to be introduced into the filter as sources of heat for air or of already heated air are usually available in any sewage treatment plant. Thus, air may be readily heated by waste heat from such sources as exhaust heat from the building heating system or from pumps or compressors or other units which create heat as a result of their operation or incidental thereto, or from the burning of waste gases evolved in the treatment of sewage in the plant.

I prefer to employ with the filtering treatment of my invention the usual primary treatment including screening, grit removal and the like. Accordingly, after the usual screening I prefer to effect a settling operation on the raw, unfiltered sewage before it is fed to the first section of the filter, and this is accomplished by passing it into a settling tank and effecting the settling in a manner similar to that which raw sewage or other waste materials are customarily settled. Of course, where the material which arrives at the filtration plant has been previously treated to remove settleable solids, or contains no appreciable quantity of settleable solids it is not necessary to provide such a settling tank to the filter.

From the settling tank the waste material is delivered to the filter by suitable means, and ordinarily a pump is provided for elevating the material to the top of the filter. However, where a head is already available as in the case where the settling tank is located at a level above the top of the filter, it may not be necessary to provide a pump and the waste material may be allowed to flow by gravity into the top of the filter.

The effluent from the last section of the filter preferably is settled in any suitable manner as by use of a settling tank in order to remove from the effluent any settleable materials including the debris from the filter which is washed down by the material passing through the filter. Thus, the effluent finally discharged to the stream or other point of disposal is clear and free of any solids which would contaminate the stream either biologically or chemically, or which would tend to clog any pipes, valves or other liquid handling equipment.

The filtering treatment of my invention in combination with the usual primary treatment and secondary settling offers a method of complete treatment of sewage or other wastes.

In the preferred form of my process I employ a trickling filter having a filter bed approximately 18 feet deep, divided into six sections each approximately 3 feet in depth and with an interspace under each section of sufficient height to permit the application of waste material onto the top of each underlying section and to permit the introduction of air under the bottom of each overlying section.

Raw sewage after having undergone primary treatment is delivered to the filter at a predetermined, preferably uniform rate. The material is fed onto the top section of the filter and trickles downwardly through the six sections of the filter and is withdrawn from the bottom section, such effluent being subjected to a secondary settling whereafter the filtered material is passed to a point of disposal.

Simultaneously with the feeding of raw sewage onto the first section of the filter, raw sewage preferably also is fed onto the second and third sections of the filter and is allowed to trickle downwardly through such sections and the underlying sections, along with the effluent from the first filter section. Preferably the feeding to the second section is less than the feeding to the first section and preferably is around 47% of the loading on the first section and the loading on the third section is less than that on the second section and preferably is around 20% of the loading on the first section.

The hydraulic loadings on the first, second and third sections of the filter are maintained at a maximum as determined by periodic tests on the effluent from each of such sections. That is to say the hydraulic loading is maintained at a rate which will provide an effluent from the bottom section of the filter having a BOD of less than 30 p.p.m. when treating the usual domestic wastes or other sewage of equivalent BOD.

Preferably the raw sewage is applied to the top section of the filter continuously at substantially constant, instantaneous rates of application for a sufficient period of time to provide for the development of the desired organisms. This application of raw sewage or waste material is then continued, preferably without halting the application or diminishing the rate. I have found that the best results in a filter constructed and operated in accordance with my invention are obtained by maintaining a continuing flow on the filter with no interruption, no intermittent flow and no rest periods. Although I have observed that interruption of flow for short periods has no material effect on the filter and it returns quickly to high efficiencies, I believe that controlled continuous, flow should be maintained in order to maintain the high efficiencies.

Air is introduced under each of the sections of the filter in quantities substantially sufficient to meet the oxygen demand of the particular section. To this end I introduce air under sufficient pressure to overcome any resistance to the flow thereof into the particular filter section. The air introduced under each section of the filter flows upwardly through the section and through each higher section and passes out of the filter from the top of the topmost section. I supply approximately half the total air supply to the bottom of the first two sections of the filter equally divided between the two sections and the remaining half of the total air to the bottom of the remaining sections divided equally between such remaining sections.

Where ordinary sewage is passing through the filter I supply approximately one cubic foot of air for each gallon of sewage passing through the filter.

I maintain the temperature of the material passing through the filter at approximately 20° C. In view of the fact that raw sewage is customarily supplied to a filtration plant at a temperature of around 18° C. to around 22° C. it ordinarily is not difficult to maintain the desired temperature in the material passing through the filter and particularly where the filter is located within a heated building. However, if necessary in order to maintain the desired temperature, I supply the air above-mentioned to the filter at a temperature sufficient to maintain the desired temperature of the material passing through the filter. Where the filter is located in a heated building I draw the air into the filter from the interior of the building, but where such air is not available I preheat it before passing it into the filter.

In order to maintain the material passing through the filter at the desired temperature, I prefer to insulate the filter by suitable known insulating means.

Ordinarily my process does not require recirculation of the effluent since the process provides adequate treatment without recirculation. However, where it is desired to increase the capacity of the filter, and especially where peak, unusually high organic loads occur return of the effluent is effected as explained above.

For the purpose of further illustrating my invention I will describe one specific example of a filtering operation carried out in accordance with my invention. This operation was carried out in a filter constructed in accordance with the filter shown in FIGS. 1 to 4 inclusive and described hereinafter. Five different series of operations or "runs" were carried out and the hydraulic loading, the BOD of the material, the dissolved oxygen, and the BOD applied were determined. The temperature in the filter was 19° C.

In order to portray somewhat graphically the loading of the filter in the specific example and the results obtained, I have included in FIGS. 9 and 10 of the drawings two graphs which will now be described.

Three "profiles" are shown in FIG. 9 in each of which the ordinates represent the filter sections. The first curve shows the dissolved oxygen present in the material passing through the filter, expressed in parts per million (p.p.m.). The second curve shows the five day biochemical oxygen demand (BOD) of the material passing through the filter, expressed in p.p.m. The third curve shows the hydraulic loading or flow of material applied to and flowing through the filter, expressed in millions of gallons per acre per day (MGAD). In FIG. 10, a profile is shown in which the organic loading expressed in thousands of pounds per acre per day (1000 #AD) is plotted against the vertical height of the filter. In each of the curves of FIGS. 9 and 10 the values represent the averages of the five runs.

In the specific example now to be described the sewage filtered was a relatively strong settled waste having a BOD of 155.4 p.p.m. This waste was fed to the top section of the filter at a rate of 51.94 MGAD, and trickled downwardly through the six sections of the filter. Simultaneously with the feeding of the top section an additional quantity of the waste was fed onto the second section of the filter at a rate of 28.76 MGAD which trickled downwardly through the second and underlying sections of the filter. Simultaneously with the feeding of the first two sections of the filter, waste was fed onto the third section of the filter at a rate of 15.18 MGAD, and trickled downwardly through the bottom four sections of the filter. It will be seen from the foregoing that the loading on the first section of the filter was 51.94 MGAD, the total loading on the second section of the filter was 80.70 MGAD and the total loading on the third and subsequent sections of the filter was 95.88 MGAD.

The BOD of the sewage or the waste fed onto the first section of the filter was 155.4 p.p.m. which during the passage of the material through the first section of the filter was reduced to 98.6 p.p.m. The additional material fed onto the second section of the filter raised the BOD to 118.8 p.p.m. and during the course of the passage of the material through the second section of the filter the BOD was reduced to 72.6 p.p.m. The material fed onto the third section of the filter raised the BOD to 85.7 p.p.m. and the passage of the material through the third and the remaining three of the six sections of the filter reduced the BOD to 60.2 p.p.m., 42.6 p.p.m., 35.4 p.p.m. and 30.4 p.p.m., respectively. The effluent from the six sections of the filter had a BOD of 30 p.p.m.

It will be seen from FIG. 10 that an organic loading of 67,380 #AD was applied to the first section, which was reduced to 42,750 #AD in the course of the flow through the first section, and which was applied to the top of the second section. To this was added a further loading of 37,320 #AD as the result of the feeding of raw sewage to the top of the second section making the total loading on the top of the second section 80,070 #AD. This last loading was reduced in the course of the passage of sewage through the second section to a loading of 48,900 #AD, to which an additional loading of 19,680 #AD was added as a result of the addition of raw sewage to the top of the third section of the filter, bringing the total loading to 68,500 #AD. The loading was reduced during the passage of the material through the third to the sixth sections inclusive to 38,180, 34,080, 28,320, and 24,330 #AD respectively.

The percentages of BOD removed in the several sections from the first to the sixth were 36.5, 38.9, 29.7, 29.3, 16.9 and 14.1 respectively. The average efficiency of the filter was 80.4.

The effectiveness of the filter is shown by the profile of dissolved oxygen (DO) values in FIG. 9. It will be seen that there was no dissolved oxygen in the sewage passing to the first section of the filter but that in the effluent there was 0.04 p.p.m. and a similar amount in the effluent from the second section. In the effluent from the third section the dissolved oxygen increased slightly to 0.46 p.p.m. The dissolved oxygen increased rapidly in the fourth section and in the effluent therefrom was 1.82 p.p.m. The increase in dissolved oxygen in the fifth section of the filter was at approximately the same rate and there was 3.12 p.p.m. of dissolved oxygen in the effluent from the fifth section. The effluent from the sixth section filter contained 3.54 p.p.m. of dissolved oxygen.

It will be seen from the foregoing and particularly from a consideration of FIGS. 9 and 10 that in my process a certain loading is applied to the first section of the filter and the passage of the sewage through the first section provides a certain reduction in the amount of BOD. In the second step the remaining BOD load from the first step is applied to the second section of the filter and additional raw sewage is added to the second section of the filter which provides an increment sufficient to bring the load on the second section up to a value equal to or exceeding the BOD loading on the first section. This procedure is repeated for the loading of the third section wherein the effluent from the second section of the filter is applied to the third section and additional raw material is applied to the third section to bring the BOD loading back up to approximately the value of the original BOD loading on the first section.

My invention also contemplates the provision of novel apparatus for carrying out a filtering operation in accordance with my novel process. A preferred form of apparatus in accordance with my invention is illustrated somewhat diagrammatically in FIGS. 1 to 4 of the drawings to which reference now is made.

The filter system in accordance with the preferred form of my invention includes a settling tank 11 which may be of any suitable construction and which is capable of carrying out a primary settling of the raw, unfiltered sewage prior to delivery to the filter. The settling tank is connected to means for controlling the flow of sewage to the filter and for this purpose I prefer to provide a controlled weir 13 which is connected to the settling tank by a pipe 12. The controlled weir 13 is disposed over and positioned to discharge into a pump sump 14 which is connected as by a pipe 15 to a pump 16 driven by any suitable means (not shown).

Connected to the pump 16 is an influent pipe or manifold 19 adapted to deliver raw sewage to a filter 20 now to be described. The pipe 19 terminates in a spray nozzle 18 disposed above the top of the first section of the filter and adapted to feed sewage onto the top of the section. In this connection I have shown a fixed spray nozzle in connection with the small diameter filter but it will be understood that other forms of liquid applying or feeding means may be employed.

The filter 20 preferably is located within a heated building (not shown) whereby the temperature of the material passing through the filter may be readily maintained at the desired temperature. Also, this permits convenient and comfortable supervision and operation of the filter by personnel even in the coldest of weather. However, it should be noted that it is not necessary that the filter be located within a building, but it may be located outdoors so long as provision is made as referred to hereinabove, for maintaining the desired temperature of the material passing through the filter.

The filter includes a casing or housing 21 of upright, generally tubular form which is suitably supported on a suitable foundation such as the floor of a building or the ground, if the filter is not located within a building. The casing is formed principally of a suitable material having the desired strength and suitably inert to the material passing through the filter. Preferably the casing is formed from a material having insulating properties but, if desired, added insulating material may be applied to the exterior of the casing 21. In the small diameter filter shown in FIGS. 1 to 4 for the purpose of illustration, the casing is made principally from "Transite" pipe but where the filter is of larger diameter as will usually be the case it may be formed of such material as masonry or steel.

The filter in accordance with my invention, being sectionalized lends itself excellently to construction in separate sections, which are then suitably secured in superimposed relation as illustrated. Thus each section 22 preferably is separately formed and the sections are connected to one another by a suitable means, as for example a circular band 23. The casing 21 preferably is supported in vertical position by a plurality of vertically extending columns 24 supported on the floor or other surface on which the filter is located and connected by cross bars 25 and 26, thereby providing a rigid framelike structure for supporting the casing 21.

Each filter section includes a tubular casing portion 30 having spaced above its lower end a foraminous plate or screen 31. The plate or screen 31 has openings therein of sufficient size to permit the sewage to trickle therethrough but sufficiently small to retain the filter medium 33 in the portion of the casing thereabove or filter bed chamber 32. The filter medium while preferably crushed rock may be any other suitable and known filter material such as a ceramic, or a suitable plastic which is non-toxic and non-deteriorating. The medium is of a size comparable to that employed in conventional filters and preferably includes rocks or other material of 1" to 1½", 1½" to 3" or 2" to 4" in size. The filter medium rests upon the screen or plate 31 and substantially fills the filter bed chamber 32 to form a filter bed. The filter bed preferably is approximately 3 feet in height but may range in height from approximately 3 feet to approximately 6 feet.

While I have shown for the purposes of illustration a filter having a comparatively small diameter, nevertheless, my invention is not limited to such filter, but the filter may extend to any practical limit and may for example be as large as 60 feet in diameter or more.

Each filter section preferably is provided with a flange 35, secured to the casing preferably adjacent the level of the plate or screen 31, which takes the form of a floor and which is suitably attached to the columns 24 thereby to support its section independently or at least partially independently on the columns 24. This independent support or partially independent support of the separate sections of the filter permits convenient and economical construction of the filter inasmuch as the lower filter units do not have to support any of the weight of the upper units or at least do not have to support more than a portion of such weight.

Located below the screen or plate 31 which supports the filter bed and therefore below the filter bed is a space 34 which I term an "interspace" or "interphase" the purpose of which appears elsewhere herein. The interspace may be of any practicable height which will permit the introduction of sewage onto the top of the next lower filter bed and the introduction of air under the bottom of the next upper filter bed, and in certain instances the withdrawal of effluent from the next upper filter bed. It preferably is from approximately 3 inches to approximately 6 inches in height. Leading into each interspace below the first through the fifth sections is a feed or branch pipe 36 which is connected to the influent pipe 19 leading from the pump 16 and which terminates in an outlet disposed preferably over the center of the underlying filter bed. A valve 37 is provided for controlling the flow of influent through each of the feed pipes 36, whereby sewage may be selectively fed onto the top of any of the filter sections below the top section. A valve (not shown) may be provided in the section of the influent pipe 19 above the topmost feed pipe 36 for controlling the flow to the nozzle but ordinarily such a valve is not required.

Disposed in each interspace 34 above the feed pipe 36 is an effluent collector 40 which may be of any suitable form as for example spade-shaped and which is connected by an outlet pipe 41 to an effluent pipe 42 leading back to the pump sump 14. The collector 40 is disposed below the bottom of the next upper filter bed in position to receive at least a portion of the effluent therefrom and to lead it back to the pump sump or to a point of disposal as hereinafter described. Preferably I provide a valve 43 at the juncture of each outlet pipe 41 and the outlet pipe 42 whereby the withdrawal of effluent from any of the sections may be selectively controlled.

A withdrawal or discharge pipe 44 is connected to the effluent pipe 42 for conducting effluent to a point of further treatment or disposal. A valve 45 is provided whereby the recirculation and/or discharge of effluent may be controlled.

A valve 60 preferably is provided in the effluent line just ahead of the pump sump in order to control the flow of effluent into the pump sump.

Means are provided for supplying air to each of the filter sections in a quantity substantially equal to the oxygen demands of that particular section. To this end I provide means for applying sufficient pressure to the air to overcome any resistance to the flow of the air into and through the sections of the filter. Such means include a fan or blower 50 of any suitable form connected by a main air duct or manifold 51 and branch ducts 52 to each of the interspaces 34 respectively. Valves 53 are provided in each of the branch ducts for controlling the air leading into the respective interspaces.

Where it is found necessary or desirable to heat the material passing through the filter in order to maintain the desired temperature thereof, I may accomplish this by supplying to the filter air at an appropriate temperature. Accordingly, where the filter is located in a building the interior of which is heated, I arrange the fan or blower so as to draw air from the interior of such building. On the other hand where the filter is not located in a heated building, I connect the intake to the fan or blower to a suitable source of heated air such as a heated building or a heat exchanger or the like whereby the heated air is supplied to the interspaces and from thence passes upwardly into the overlying filter sections. It will be noted that while air is supplied to each of the sections, it passes upwardly through the section to which it is supplied and from thence upwardly to each of the overlying sections. Thus if the air supplied to one of the lower sections is more than adequate to supply the oxygen demands of that particular section such air passing upwardly from the section and into the next higher section is available for supplying the oxygen demands of that section. Accordingly adjustments may be made from time to time in the air supply if desired so as to provide the maximum efficiency of operation of the filter. However, I wish to point out that I find it desirable to supply an excess of air in order to insure that there is no unfilled oxygen demand in any portion of the filter.

It is believed that the operation of this form of my invention will be understood from the foregoing description of the apparatus and taken in connection with the description of the preferred form of my process. However, I wish to point out that the apparatus shown in FIGS. 1 to 4 is capable of being operated in a number of different ways and provides for carrying out various modifications of the process.

In the operation of the device shown in FIGS. 1 to 4 the sewage is caused to flow into the settling tank and the effluent from the settling tank passes to the controlled weir, the rate of flow of the sewage is controlled as in order to provide the desired hydraulic loading on the filter. From the weir the liquid flows into the pump sump and is pumped therefrom to the influent line 19. The liquid is fed onto the top of the upper section of the filter and trickles downwardly through the successive sections of the filter, the effluent from the bottom section being withdrawn from the bottom section by the effluent pipe 44. Preferably the top two valves 37 are opened whereby sewage is fed onto the top of the second and third sections of the filter simultaneously with the loading of the first section. The amount of flow or loading on the second and third sections is controlled by the upper two valves 37.

Air is introduced below the bottom of each of the sections of the filter to the air duct 51 and leads 52 the amount of air passing into each section of the filter being controlled by the valves 53.

Where it is desired to recirculate the effluent from any of the sections the appropriate effluent valve 43 is opened and the effluent withdrawn from the corresponding section and allowed to flow to the pump sump where it is mixed with the raw sewage before being returned to the filter. In this connection it will be noted that FIG. 1 shows the pump sump as above the level of the bottom of the filter but it may be below the bottom so that it will not be necessary to pump the effluent into the pump sump although a pump may be provided for this purpose, if found necessary or desirable. On the other hand where the primary settling tank is located above the filter, the pump 16 may be omitted but a pump will be required in order to recirculate withdrawn effluent.

Each effluent valve 43 may if desired be provided with means (not shown) for withdrawing effluent for the purpose of sampling the effluent in order to permit the desired control of the operation of the filter.

It will be noted that the effluent collector or spade extends over a substantial area of the filter and therefore receives a substantial portion of the effluent from the next upper filter section. When the valve which controls the withdrawal of effluent from the corresponding portion of the filter is open effluent which falls onto the collector is withdrawn, the rate of withdrawal being controlled by the extent to which the valve is opened. Any effluent which falls onto the collector and which is not withdrawn by the outlet pipe overflows and falls onto the top of the next lower section. Similarly, when the valve is closed any liquid which falls onto the collector overflows from the collector and onto the top of the next lower filter section. Thus the presence of a collector above each filter section (except the first section) does not interfere materially with the flow of sewage through the filter except to the extent that it serves to remove effluent from the filter as desired and as controlled by the valve.

The filter in accordance with my invention may take various forms. Thus it may be of circular, rectangular or annular construction, or formed as a portion of an annulus. Also the filter may be of considerably larger diameter than the filter shown in FIGS. 1 to 4 inclusive. Moreover, the filter lends itself readily to a combination with a digester or with a primary settling tank or a final settling tank or any combination of such other structures.

Figure 5:
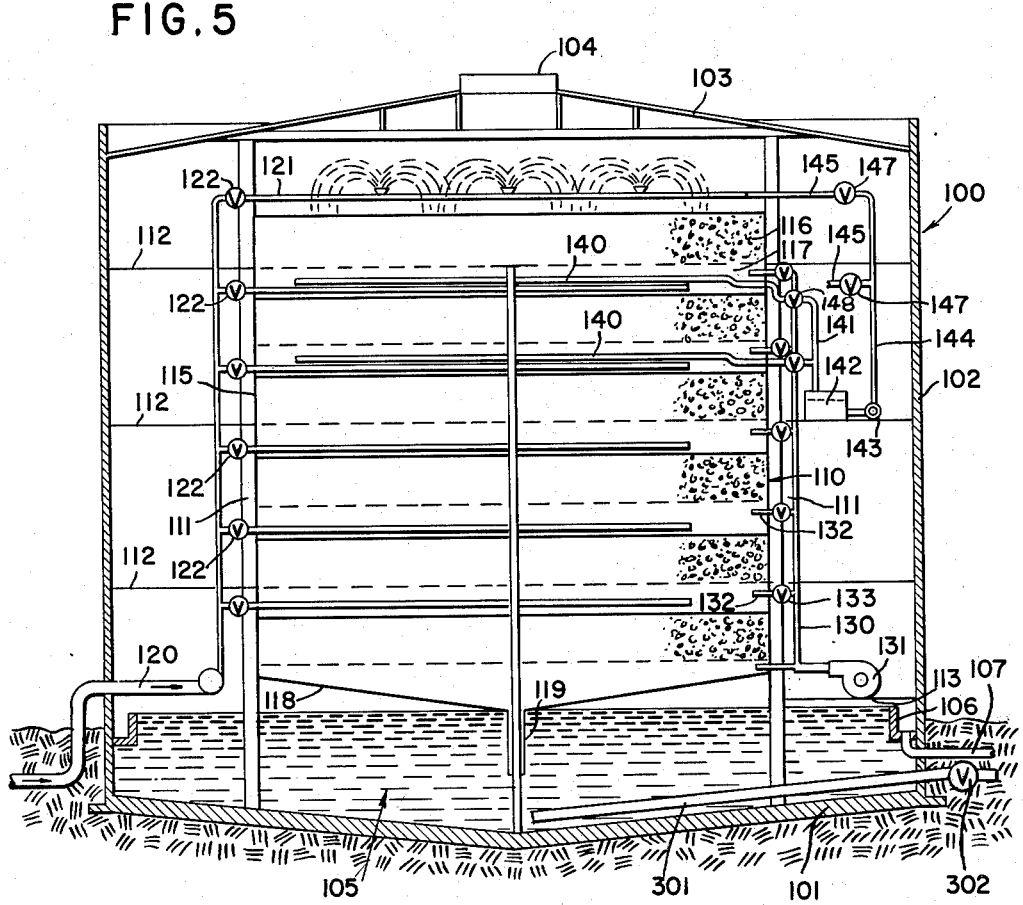
FIG. 5 is a somewhat diagrammatic vertical sectional view through a second embodiment of the invention.
Figure 6:
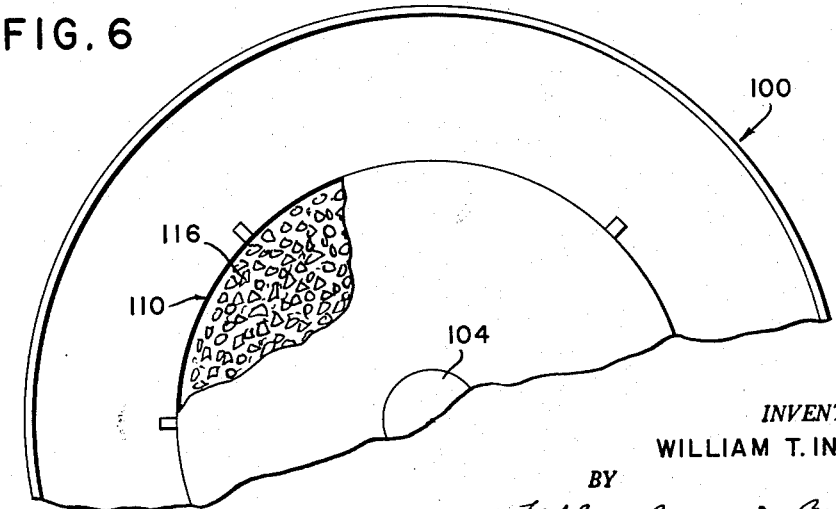
FIG. 6 is a fragmentary top plan view of the structure of FIG. 5, with a portion broken away to show the interior.

Referring now to FIGS. 5 and 6 there is illustrated a structure wherein a filter is combined, in accordance with my invention, with a final settling tank, both of which structures are enclosed within a housing or building.

The building 100 is formed with a base or bottom floor 101 supported as by the ground, an upstanding cylindrical side wall 102 and a roof 103 having an air vent 104. The floor 101 and the lower portion of the side wall 102 define a final settling tank chamber 105. A weir trough 106 is provided in the chamber from which leads a draw-off conduit 107 for conducting the effluent from the final settling tank to a point of disposal. Suitable sludge removing means (not shown) may be provided for withdrawing the sludge which settles to the bottom of the settling tank.

Disposed within the housing 100 above the final settling tank and preferably centrally of the housing is a trickling filter 110 constructed in accordance with my invention. Preferably the filter is supported by columns 111 upstanding from the floor 101 and by a plurality of upper floors 112 supported by the columns 111 and by the building wall 102. It will be noted that only three such upper floors 112 are provided, instead of providing one floor for each section of the filter as is shown in connection with the filter illustrated in FIGS. 1 to 4 of the drawings. A floor 113 also preferably is provided which extends over the portion of the settling tank from the column 111 to the wall 102, the portion of the final settling tank inwardly thereof being covered by the filter 110.

The filter 110 is generally similar in construction to the filter shown in FIGS. 1 to 4 of the drawings and includes a housing 115 formed of suitable material such as metal. The housing is divided into six filter sections each of which includes a filter bed chamber 116, in which is supported a filter bed of suitable material, and an interspace 117 under each filter bed chamber. An influent pipe 120 is provided which leads from a pump (not shown) which in turn is connected to a source of settled sewage preferably in the manner illustrated in FIG. 1 of the drawings.

Connected to the inflow pipe 120 above each of the filter sections are taken-off or distributor pipes 121 which extend across the top of each filter section. A valve 122 is provided in each of the take-off or distributor pipes 121 except the topmost one for the purpose of controlling the flow of sewage from the inflow pipe 121. The distributor pipes 120 preferably are of such extent and arrangement as to distribute the sewage over the filter bed substantially uniformly although as pointed out hereinabove it is not essential to my invention that the distribution be as uniform as in other types of filters.

An air duct 130 connected to an air blower or fan 131 is provided from which extends air inlet pipes 132 leading into the interspaces 117 under the several filter beds and a valve 133 is provided in each of the pipes 132 for controlling the flow therethrough. The air supply arrangement is constructed and operated in a manner generally similar to that described in connection with the first form of my invention.

Means are provided for withdrawing effluent from one or more of the sections and returning it to the same or a higher section. This recirculation however differs from that shown in FIGS. 1 to 4 in that the effluent withdrawn from the sections is not conducted to a sump or like tank and there mixed with raw sewage and returned to such raw sewage but is delivered directly to the section or sections to which it is recirculated. However, it will be understood that an arrangement such as shown in FIGS. 1 to 4 may be employed if desired.

To this end I provide a collector 140 in one or more of the interspaces and preferably in the interspaces under the first and second filter beds only. The collectors 140 are connected to withdrawal pipes 141 which lead to a sump 142 to which is connected a pump 143. A return pipe 144 is connected to the discharge side of the pump and leads to inflow pipes 145 which are connected to the respective distributing pipes. Valves 147 are provided in the pipes 145 and valves 148 are provided in the pipes 141 for controlling the flow of effluent therethrough.

It will be seen from the foregoing that the arrangement just described permits effluent to be withdrawn from under the first section of the filter and returned to the first section or from under the second section of the filter and returned either to the first section or the second section, or withdrawn from under both the first and second sections and delivered to either or both of said sections.

While I have shown means for recirculating effluent only from the first two sections, it will be understood that means (not shown) may be provided for withdrawing effluent from any one or more of the sections and returning it to the same or any higher section as shown in FIGS. 1–4. Moreover means (not shown) may be provided for conducting such effluent to a point of further treatment or disposal.

Below the lowermost interspace a floor or bottom filter wall is provided in order to prevent the effluent from the bottom filter section from flowing off to the floor or ground and such bottom wall serves as a collector for the effluent from the bottom filter section whereby such effluent may be withdrawn from the chamber formed by the filter wall and the bottom plate or floor.

The bottom wall 118 of the filter is formed so that it inclines downwardly toward the center of the filter and thus provides a hopper-like construction which directs the effluent from the bottom filter section toward the center of the filter. Depending from the central portion of the bottom or floor 118 is a vertical discharge pipe 119 which extends down into the final settling chamber a substantial distance so that the effluent is discharged into the final settling chamber well below the top of the latter for a purpose which will hereinafter appear.

In using the apparatus illustrated in FIGS. 5 and 6 the inflow pipe 120 is connected to a source of settled sewage such as a primary settling tank and the sewage is caused to flow into the inflow pipe 120. The sewage is delivered onto the selected section or sections of the filter by appropriate operation of the valves 122. As indicated above I prefer to feed the sewage onto the first three sections of the filter in predetermined proportions, the larger portion of the sewage being fed onto the top section and the next larger portion onto the second section and the smallest of the three portions onto the third section.

Air is supplied under each of the sections in a manner similar to that above described and the sewage is recirculated if desired in order to provide the optimum operating conditions. The sewage delivered onto each of the sections trickles down through that section and each of the succeeding sections and walls into the hopper provided by the bottom wall 118 of the filter from whence it flows through the discharge pipe 119 into the final settling tank. As the effluent from the filter collects in the final settling tank the bottom wall rises until it overflows into the weir trough 106 from whence it is withdrawn to the withdrawal pipe 107. The effluent in flowing from the discharge pipe 119 into the final settling tank flows radially outwardly of the tank to the weir trough and in the course of such travel any solids fall to the bottom of the tank so that only clear effluent flows from the final settling tank. The solids which fall to the bottom of the tank are removed in any suitable manner in accordance with conventional practice. For example a withdrawal pipe 301 having a valve 302 may be provided.

Recirculation of the effluent from any of the sections of the filter may be effected by suitable operation of the recirculation system. Also the effluent from the lower sections of the filter may be recirculated therethrough in order to provide an increase in the stabilization thereof.

Referring now to FIGS. 7 and 8 there is shown a construction wherein a filter in accordance with my invention is combined with a primary settling tank, a digester and a final settling tank. In the construction shown the digester 200 is formed by a bottom wall 201 which is suitably supported as by the ground, an upstanding cylindrical side wall 202, a top wall 203 and an upstanding cylindrical inner wall 204, a cover 205, which preferably is adapted to float on the contents of the digester is provided. The digester is provided with suitable known means (not shown) for removing gases evolved during the digestion process, heating the contents, and for withdrawing the settled, digested sludge and the supernatant liquor.

The side wall 202 of the digester is extended upwardly beyond the top wall 203 and defines with the top wall 203 and the central wall 204 an annular primary settling tank located above the digester. The settling tank is provided with an annular inner weir trough 211 and an outer weir trough 212 for a purpose which will hereinafter appear.

It should be noted that the digester preferably is circular in shape but the final settling tank, the filter hereinafter described and the enclosing wall of the structure all preferably extend through less than a complete circle, namely approximately 270°, thereby providing a space of segmental shape in which controls and other equipment may be located. Moreover the aforesaid segmental space provides ready access to the various portions of the structure which would not be provided without such space.

The aforesaid space is defined by two vertical walls 215 which extend inwardly from the outer periphery of the structure to the inner wall 205 and thus serve as end walls for the final settling tank, the filter and the enclosure surrounding the filter hereinafter described more in detail.

A supply or inflow pipe 218 leading from the source of sewage extends preferably through the segmental space and has at least two branches 219 discharging into the weir trough 211.

A filter 220 constructed in accordance with my invention is disposed in partially surrounding relation to the digester. The filter 220 preferably is of partially annular form and does not extend continuously but only to the end walls 215, as shown particularly in FIG. 9 of the drawings. The filter 220 is shown somewhat diagrammatically but it will be understood that it is constructed in a manner generally similar to the filter shown in FIG. 6 of the drawing, and includes six filter sections 221 and six interspaces 222. The filter casing or housing is of course of partially annular form and may be constructed of any suitable material. It is formed with an outer wall 223 and an inner wall 224 which is preferably in intimate contact with the wall 202 of the digester, and this construction is preferred. However, in some cases it may be found desirable to employ the wall 202 of the digester as the inner wall of the filter 220 in a manner which will be obvious from FIGS. 7 and 8 of the drawings.

The filter is supported in part by the side wall of the digester and in part by an outer wall 270 which extends circumferentially around the digester and filter in spaced relation to the filter and terminates preferably at the end walls 215. The outer wall and digester support a plurality of floors 271 which may serve to support the filter and the pumps, control mechanism and the like which are associated with the filter. A roof 272 also may be provided which extends between the outer wall 270 and the filter and serves to cover the space provided between the filter and the outer wall 270.

A bottom wall 273 is provided for the filter which is inclined inwardly and downwardly to provide a hopper-like wall for a purpose which will hereinafter appear.

An influent pipe 230 leads from the weir trough 212 of the primary settling tank and is provided with branches 231 providing feed pipes leading into the space above each of the filter sections for feeding effluent from the primary settling tank onto each of the filter sections. A valve (not shown) is provided in each of the feed pipes for the purpose of controlling the feed of sewage onto each of the sections in a manner similar to that described in connection with the other embodiments of my invention.

While I have illustrated only one such inflow or sewage weed pipe 230 and its branches it will be understood that I preferably provide a plurality of such pipes, spaced peripherally along the structure in order to provide for withdrawing effluent from the weir trough 212 at a plurality of points and for delivering the effluent to the filter at a plurality of points. Moreover, I preferably provide suitable means (not shown) for distributing the sewage over the surfaces of the filter sections onto which it is delivered.

I have shown somewhat diagrammatically means for delivering sewage onto all of the filter sections, although ordinarily I prefer to feed the sewage only onto the top three sections of the filter, as pointed out hereinabove.

I also provide means for supplying air under each of the six filter sections of the filter which means is constructed and operated in a manner generally similar to the equivalent means hereinabove described. To this end I provide a pump or blower 240 to which is connected an air duct 241 having inlet pipes 242 leading into the space under each of the several filter sections, suitable means (not shown) being provided for controlling the distribution of air to each of the sections.

In view of the long extent of the arcuately shaped filter, I prefer to provide means for introducing air under each of the filter sections at a plurality of points spaced circumferentially throughout the filter, in a manner somewhat similar to that described in connection with the introduction of the sewage onto the section. To this end I provide suitable ducts or branch ducts (not shown) distributed about the filter so that the air is introduced under each of the sections in a distributed manner sufficient to provide adequate oxygen supply to meet the oxygen demands of each of the sections throughout all portions thereof.

I provide in the filter illustrated in FIGS. 7 and 8 means for recirculating sewage from below one section to the top of the same section or to a higher section, constructed in accordance with the principles described hereinabove. To this end I provide a withdrawal pipe 250 leading from a collector (not shown) located in the interspace under the second filter section, a sump 251 connected thereto, a pump 252 connected to the sump and a return pipe 253 connected to influent pipes 254 which lead to the top of the first and second sections respectively for returning withdrawn effluent to such sections or it may lead by suitable conduit (not shown) to the weir trough 212 there is to be mixed with settled sewage and redistributed to filter sections. Valves (not shown) preferably are provided for controlling the flow of the recirculated sewage.

As explained hereinabove the arrangement for withdrawing effluent from certain of the sections and recirculating it to the same or higher sections may be so constructed as to provide for the withdrawal of the effluent from any of the sections and returned to any higher point in the filter.

Disposed below the filter is a final settling tank 260 preferably of partially annular form similar to the filter. The final settling tank is defined by a bottom wall 261, an extension 262 of the digester side wall and an outer wall 263. The outer wall 263 preferably extends upwardly and supports or forms a portion of the outer wall 270 which closes the filter. A weir trough 255 is provided on the inner side of the outer wall 263 of the settling tank and a withdrawal conduit 256 leads therefrom. The bottom wall 273 of the filter is arranged to discharge effluent from the bottom section of the filter into the settling tank adjacent the inner wall thereof.

Suitable means preferably is provided for withdrawing the settled sludge from the primary settling tank and the secondary settling tank and delivering it to the digester for treatment therein. A valved line 303 is provided for passing sludge from the primary settling tank to the digester. A valved line 304 having an intake 306 and a sump 305 is provided for passing sludge from the secondary settling tank to the digester and also to the primary settling tank. A valved line 307 is provided for withdrawing sludge from the digester.

In the use of the apparatus illustrated in FIGS. 7 and 8 of the drawings, sewage is caused to flow through the inflow pipe 218 and the branches 219 and is discharged into the weir trough 211 from whence it overflows into the principal chamber of the primary settling tank. The sewage flows radially outwardly across the settling chamber during which the settleable solids fall to the bottom of the settling chamber and pass from thence into the digester. The sewage flows from the weir trough 212 to the pipe 230 and the distributing pipes 231 and is fed onto the first, second and third filter sections (depending upon the adjustment of the corresponding valves (not shown)). The sewage then trickles downwardly to the filter sections and into the final settling tank. The sewage flows outwardly from the inner portion of the final settling tank and into the weir trap from whence it is discharged from the filter. During the passage of the liquid across the final settling tank, the settleable solids fall to the bottom of the bottom settling tank from which they are removed by suitable means (not shown).

Air is supplied to the interspace under each of the filter sections in a manner similar to that above described and passes upwardly to the filter sections to provide the required oxygen demand of each of the filter sections.

Where it is found desirable sewage effluent from one or more of the filter sections is returned to the head of that section of the head of a preceding section in a manner similar to that above described.

It will be seen from the foregoing that my invention provides a filter having a very high capacity for any given size, namely, ground area. Thus the filter of my invention for any selected capacity occupies less area than prior filters of equivalent capacity. Moreover, the filter of my invention lends itself admirably to combining with a final settling tank or with a digester or with a digester and primary settling tank or with a digester and both primary and final settling tank. Thus the combined structure, which may be any one of the aforementioned structures, occupies no more than or only slightly more than the area occupied by the element or elements with which the filter is combined such as the final settling tank or the digester. This feature of my invention is of considerable importance and particularly where the ground space of a sewage treatment plant is limited as is particularly true where the filter or other equipment is to be installed in an already constructed and operating filter plant. In fact, the filter is of such construction that it may be added to an already existing final settling tank or digester, where it is desired to increase the capacity of the treatment plant.

My filter is sectionalized, and consequently its construction is simplified. The filter structure can be designed as a building of several floors and with the weight distributed to columns at each floor level. It is amenable to rectangular, circular or annular design, and the filter may be combined with settling tank units and built up as a series of floors above the repository for filter effluent. Moreover, it lends itself admirably to combination with a digester tank or both a digester tank and settling tanks.

The quality of the effluent from my filter is comparable to that of activated sludge process effluent, and therefore my filter may be installed in lieu of activated sludge equipment as secondary treatment equipment.

The simplified operation possible with my filter makes it suitable for use for municipalities whose operating funds are limited and whose available manpower is accordingly limited.

The ability of my filter to take shock loads without the complete plant upset makes it of considerable value where there are occasional discharges of very strong waste. Moreover, it is capable of handling waste material having no dissolved oxygen, in view of the fact that the abundance of air supply and the depth of the filter combine to overcome the problem of oxygen deficiency.

Even where my filter is operated without recirculation it produces both hydraulic and biological benefits equivalent to those of filters in which recirculation is a necessary part of the operation. It will be seen that inasmuch as the filter permits relatively high hydraulic loading, it carries away the debris from the area sections and prevents clogging thereof. Moreover, it carries materials from the earlier sections to the later sections which serve as food for the organisms in such later sections. Also, the filter of my invention provides for automatic receiving of the later sections by carrying organisms from the earlier sections to the later sections, and thereby maintains the biological activity of the later sections.

It should be noted in the foregoing connection that whereas in a conventional filter which is operated with recirculation, only the filter effluent is returned to the top of the filter, on the other hand, in my process it is possible to recirculate material from any of the intermediate sections to a preceding section and thereby closely control the nature of the material which is recirculated.

In my filter treatment there is no immediate unsatisfied oxygen demand and hence the effluent has stable character whereas in conventional high rate filters there is an unsatisfied oxygen demand and the effluent is not stable.

In my filter, there is no limit, except an economic one, to the total depth of the filter. However, I do limit the depth of each section as stated above and I supply air under each section. Accordingly there is no septic condition present as there is in a deep filter wherein air is supplied only under the bottom of the filter.

My invention provides a filtering operation wherein the BOD removal is higher than in prior processes at application rates over 15 times greater than the rates usually considered safe for filters without recirculation and more than twice the rates considered safe for filters with recirculation (high rate filters).

The effectiveness of my process is shown by a number of indices. I have found that in practicing my process the BOD removal efficiency is extremely good under ordinary conditions and in specific tests averages ranged from 79% to 92.1%. I have obtained a BOD removal of as high as 94.1%. In fact using as an example one specific test series wherein raw sewage was applied to the first and second sections and optimal filter growth conditions were maintained, I have found that the greatest single observation of BOD removal efficiency was 98.1% and at no time during this run was a filter effluent BOD of more than 14 p.p.m. observed.

Another index of the effectiveness of my process is the relative stability of the effluent. I have noted that the effluent from a filter operated in accordance with my invention showed relative stabilities which rarely fell below 60% regardless of loading and which in some cases were as high as 99%.

Solids in the effluent resulting from my filtration process are easily settled leaving a supernatant liquid of exceptional clarity. The volume of settleable solids measured in an Imhoff cone ranges from about 0.5 ml. to 5 ml. and usually from 2 to 4.

The effluent holds a turbidity of less than 40 p.p.m. Lettering can be read through an Imhoff cone with little distortion.

Nitrification is another index of stabilization of the waste. Nitrites have been recovered in proportions ranging from 0.005 p.p.m. to 2.5 p.p.m. and nitrates in proportions ranging from traces to 4.8 p.p.m.

Examinations of the effluent indicate a high degree of organic activity. Zooglea and false branching filamentous organisms are characteristic of the upper sections of the filter. At increasing depth, stalked ciliates and zooglea increase; filamentous organisms decrease; free swimming flagelates appear; worms and other macroscopic life become part of the biota.

I claim:

1. The method of biologically treating essentially liquid waste material which comprises continuously feeding the waste material to be treated onto a first section of a single trickling filter having superimposed sections spaced from one another, allowing said material to pass downwardly through said section, allowing the effluent from said first section to fall freely downwardly by gravity from said section onto the next succeeding filter section, allowing said effluent to pass downwardly through said next succeeding filter section, continuously introducing air under pressure simultaneously under each of said sections and passing all of the air from each section upwardly through the next preceding section.

2. The method as set forth in claim 1 wherein the air is introduced at a temperature not substantially less than the temperature of the material passing into the filter.

3. The method as set forth in claim 1 wherein the temperature of the material passing through the filter is maintained at between approximately 16° C. and approximately 27° C.

4. The method as set forth in claim 1 wherein air is introduced under each of said sections in amounts whereby the total air entering each section is at least equal to satisfy the demands of the biological organisms in each of said sections, respectively.

5. The method as set forth in claim 1 wherein at least one cubic foot of air is supplied for each gallon of waste material fed to said filter.

6. The method of biologically treating essentially liquid waste material which comprises continuously feeding the waste material to be treated onto a first section of a single trickling filter having superimposed sections spaced from one another, allowing said material to flow downwardly through said first filter section in a thin film over a biologically active growth adhering to a filter media, allowing the effluent from said first section, to fall freely downwardly, by gravity from said section onto the next succeeding filter section, in the same condition as it leaves the preceding filter section allowing said effluent to flow downwardly through said next succeeding filter section in a thin film over a biologically active growth adhering to a filter media, continuously introducing air under pressure simultaneously under each of said sections and passing all of the air from each section upwardly through the next preceding section.

7. The method of biologically treating essentially liquid waste material which comprises continuously feeding the material to be treated onto a first section of a single trickling filter having superimposed sections spaced from one another, allowing said material to pass downwardly through said filter section, allowing the effluent from said first section to flow downwardly successively through a plurality of succeeding filter sections with the effluent falling freely downwardly by gravity from each section onto the next succeeding section, continuously introducing air under pressure simultaneously under each of said sections and passing all of the air from each section upwardly through the next preceding section.

8. The method of biologically treating essentially liquid waste material which comprises continuously feeding the waste material to be treated onto a first section of a single trickling filter having superimposed sections spaced from one another, allowing the material to pass downwardly through said first filter section, allowing the effluent from said first filter section to pass downwardly successively through at least three succeeding filter sections, with the effluent falling freely downwardly by gravity from each section onto the next succeeding section, continuously introducing air under pressure simultaneously under each of said sections and passing all of the air from each section upwardly through the next preceding section.

9. The method of biologically treating essentially liquid waste material which comprises continuously feeding the material to be treated onto a first section of a single trickling filter having superimposed sections spaced from one another, allowing said material to pass downwardly through said filter section, allowing at least a portion of the effluent from said first section to flow downwardly successively through a plurality of succeeding filter sections with effluent from each section falling freely downwardly by gravity from each section onto the next succeeding section, delivering a portion of the effluent from at least one of said sections onto said section, continuously introducing air under pressure simultaneously under each of said sections and passing all of the air from each section upwardly through the next preceding section.

10. The method of biologically treating essentially liquid waste material which comprises continuously feeding the material to be treated onto a first section of a single trickling filter having superimposed sections spaced from one another, allowing said material to pass downwardly through said filter section, allowing at least a portion of the effluent from said first section to flow downwardly successively through a plurality of succeeding filter sections with effluent from each section falling freely downwardly by gravity from each section onto the next succeeding section, delivering a portion of the effluent from at least one of said succeeding sections onto said section together with the effluent from the next preceding section, continuously introducing air under pressure simultaneously under each of said sections and passing all of the air from each section upwardly through the next preceding section.

11. The method of biologically treating essentially liquid waste material which comprises continuously feeding the material to be treated onto a first section of a single trickling filter having superimposed sections spaced from one another, allowing said material to pass downwardly through said filter section, allowing at least a portion of the effluent from said first section to flow downwardly successively through a plurality of succeeding filter sections with effluent from each section falling freely downwardly by gravity from each section onto the next succeeding section, unrestrictedly delivering at least a portion of the effluent from at least one of said sections onto a section ahead of the section from which removed, continuously introducing air under pressure simultaneously under each of said sections and passing all of the air from each section upwardly through the next preceding section.

12. The method of biologically treating essentially liquid waste material which comprises continuously feeding a portion of the waste material to be treated simultaneously onto a plurality of successive sections of a single trickling filter having superimposed sections spaced from one another, allowing the material to pass downwardly through each section, allowing the effluent to fall freely downwardly by gravity from each section onto the next succeeding filter section, continuously introducing air under pressure simultaneously under each of said sections and passing all of the air from each section upwardly through the next preceding section.

13. The method of biologically treating essentially liquid waste material which comprises continuously feeding the waste material to be treated onto a first section of a single trickling filter having superimposed sections spaced from one another, allowing the material to press downwardly through said first filter section, allowing the effluent from said first filter section to pass downwardly successively through at least three succeeding sections, with the effluent from each section falling freely downwardly by gravity from each section onto the next succeeding section delivering onto at least certain of said succeeding sections unfiltered waste material along with said effluent from the preceding section, continuously introducing air under pressure simultaneously under each of said sections and passing all of the air from each section upwardly through the next preceding section.

14. The method of biologically treating essentially liquid waste material which comprises continuously feeding the waste material to be treated simultaneously onto a plurality of successive sections of a trickling filter having superimposed sections spaced from one another, allowing the effluent from each section to fall freely downwardly by gravity from said section onto the next succeeding filter section, the hydraulic loading on the sections following the initial section being greater than the hydraulic loading on the initial section, continuously introducing air under pressure simultaneously under each of said sections and passing all of the air from each section upwardly through the next preceding section.

15. The method of biologically treating essentially liquid waste material which comprises continuously feeding at predetermined, substantially constant, instantaneous rates of application the waste material to be treated onto a first section of a single trickling filter having superimposed sections spaced from one another, allowing said material to pass downwardly through said section, allowing the effluent from said first section, to fall freely downwardly by gravity from said section onto the next succeeding filter section, allowing said effluent to pass downwardly through said next succeeding filter section, continuously introducing air under pressure simultaneously under each of said sections and passing all of the air from each section upwardly through the next preceding section.

16. The method of biologically treating essentially liquid waste material which comprises continuously feeding waste material to be treated simultaneously onto a plurality of sections of a trickling filter having superimposed sections spaced from one another, allowing the waste material to pass downwardly through each of said sections, allowing the effluent from each of said sections to fall freely downwardly by gravity from each section unrestrictedly onto the next succeeding filter section, allowing the effluent from the final one of said plurality of filter sections to fall freely by gravity downwardly from said section onto a succeeding filter section to which no untreated material is delivered, continuously introducing air under pressure under each of said sections and passing all of the air from each section upwardly through the next preceding section.

17. A trickling filter for biologically treating essentially liquid waste material comprising a closed, vertically disposed tubular casing of substantially uniform horizontal cross-section and having a vent at the top, a plurality of vertically aligned grids at spaced locations in said casing, each extending entirely across said casing, a bed of filter media disposed on each of said grids and terminating below the superjacent grid whereby a substantially unrestricted space is provided between each grid and the top of the next subjacent filter bed, means for feeding essentially liquid waste material onto at least the topmost filter bed, and means for introducing air under pressure into said casing simultaneously under each of said grids.

18. A trickling filter for biologically treating essentially liquid waste material comprising a closed, vertically disposed tubular casing of substantially uniform horizontal cross-section and having a vent at the top, a plurality of vertically aligned grids at spaced locations in said casing, each extending entirely across said casing, a bed of filter media disposed on each of said grids and terminating below the superjacent grid whereby a substantially unrestricted space is provided between each grid and the top of the next subjacent filter bed, means for feeding essentially liquid waste material simultaneously onto a plurality of said filter beds, and means for introducing air under pressure into said casing simultaneously under each of said grids.

19. A trickling filter for biologically treating essentially liquid waste material comprising a closed, vertically disposed tubular casing of substantially uniform horizontal cross-section and having a vent at the top, a plurality of vertically aligned grids at spaced locations in said casing, each extending entirely across said casing, a bed of filter media disposed on each of said grids and terminating below the superjacent grid whereby a substantially unrestricted space is provided between each grid and the top of the next subjacent filter bed, means for feeding essentially liquid waste material onto at least the topmost filter bed, means for returning effluent from at least one of said filter beds to said filter ahead of said filter bed and means for introducing air under pressure into said casing simultaneously under each of said grids.

20. A trickling filter for biologically treating essentially liquid waste material comprising a closed vertically disposed tubular casing, having a vent at the top, a plurality of superimposed filter sections in said casing, each including a grid extending entirely across said casing and a bed of filter media disposed on said grid, each bed having a substantially uniform horizontal cross-section substantially the same as the cross-section of subjacent bed, each bed below the top bed terminating below the superjacent grid whereby a substantially unrestricted space is provided between each grid and the top of the subjacent filter bed, means for feeding essentially liquid waste onto at least the topmost bed, and means for introducing air under pressure simultaneously under each of said grids.

21. A trickling filter for biologically treating essentially liquid waste material comprising a closed vertically disposed tubular casing having a vent at the top, at least four superimposed filter sections in said casing, each including a grid and a bed of filter media disposed on said grid, each bed having a substantially uniform horizontal cross-section substantially the same as the cross-section of the subjacent bed, each bed being not substantially less than three feet deep and each bed below the top bed terminating below the superjacent grid whereby a substantially unrestricted space is provided between each grid and the top of the subjacent filter bed, means for feeding essentially liquid waste onto at least the topmost bed, and means for introducing air under pressure simultaneously under each of said grids.

22. Apparatus for biologically treating essentially liquid waste material comprising a digester, a primary settling tank disposed vertically above said digester and having a discharge outlet leading to said digester, a trickling filter surrounding the major portion of the circumference of said digester and extending vertically throughout the height of said digester, said filter including a closed casing, a plurality of superimposed and vertically spaced filter sections in said casing and means for introducing air under pressure under each of said filter sections, a secondary settling tank vertically below said filter, means for feeding effluent from said primary settling tank onto at least the top section of said filter, means for discharging effluent from the bottom section of said filter into said secondary settling tank, and means for discharging settled sludge from at least one of said settling tanks into said digester.

23. Apparatus as set forth in claim 22 wherein said primary settling tank has a discharge outlet located above the level of the top section of said trickling filter.

24. Apparatus as set forth in claim 22 wherein means are provided for feeding waste material to be treated simultaneously into a plurality of said filter sections.

25. Apparatus as set forth in claim 22 wherein means are provided for removing from said filter at least a portion of the effluent from at least one of said filter sections and returning such effluent to said filter ahead of the point from which it is removed.

References Cited in the file of this patent

UNITED STATES PATENTS

| 576,378   | Robinson      | Feb. 2, 1897  |
|-----------|---------------|---------------|
| 636,447   | Paddock       | Nov. 7, 1899  |
| 762,466   | Church et al. | June 14, 1904 |
| 2,008,507 | Laughlin      | July 16, 1935 |
| 2,308,866 | Dekema        | Jan. 19, 1943 |
| 2,340,842 | Reybold et al.| Feb. 1, 1944  |
| 2,442,432 | Prager        | June 1, 1948  |
| 2,553,228 | Yonner        | May 15, 1951  |
| 2,580,764 | Gunz          | Jan. 1, 1952  |
| 2,789,696 | Jahnig et al. | Apr. 23, 1957 |

FOREIGN PATENTS

| 502,962   | Great Britain | Mar. 23, 1939 |
| 933,575   | France        | Jan. 1, 1948  |
| 1,104,926 | France        | June 22, 1955 |

Dedication 2,992,986.—*William T. Ingram*, Whitestone, N.Y. TREATMENT OF SEWAGE AND OTHER WASTE MATERIAL. Patent dated July 18, 1961. Dedication filed Mar. 14, 1972, by the assignee, *Monsanto Enviro-Chem Systems, Inc.*

Hereby dedicates to the Public the entire remaining term of said patent.
[*Official Gazette June 27, 1972.*]